March 29, 1960 J. F. BERTSCH 2,930,628
DUAL HEIGHT LEVELING DEVICE
Filed March 5, 1958 2 Sheets-Sheet 1

INVENTOR.
Joseph F. Bertsch
BY
W. S. Pettigrew
ATTORNEY

March 29, 1960 J. F. BERTSCH 2,930,628
DUAL HEIGHT LEVELING DEVICE
Filed March 5, 1958 2 Sheets-Sheet 2
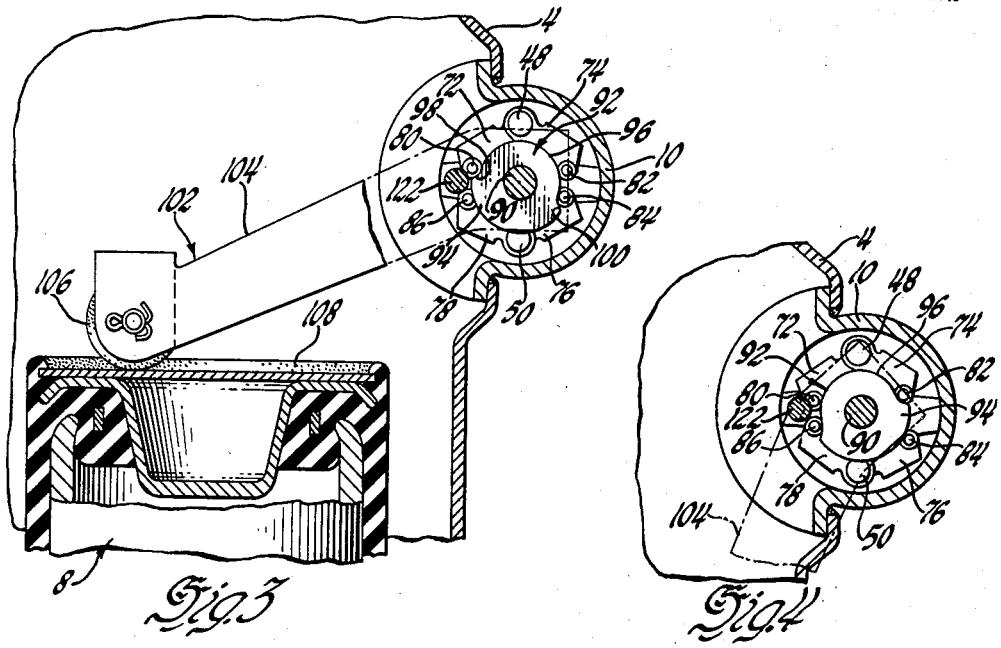
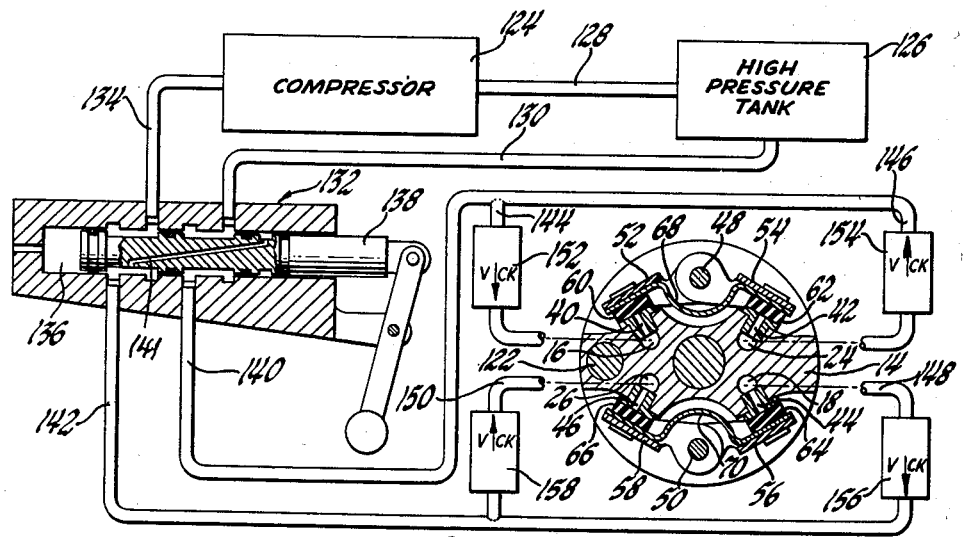
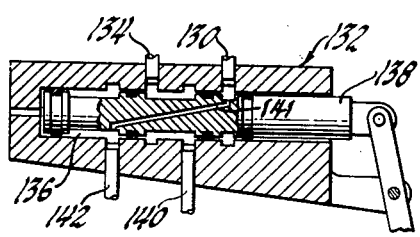
INVENTOR.
Joseph F. Bertsch
BY
W. S. Pettigrew
ATTORNEY United States Patent Office 2,930,628
Patented Mar. 29, 1960

2,930,628
DUAL HEIGHT LEVELING DEVICE

Joseph F. Bertsch, Detroit, Mich., assignor to General Motors Corporation, Detroit, Mich., a corporation of Delaware Application March 5, 1958, Serial No. 719,418

16 Claims. (Cl. 280—124)

This invention relates to pneumatic vehicle suspension and more particularly to a system and apparatus for controlling inflation and deflation of air springs to provide two different predetermined trim or standing heights for the vehicle.

The recent adoption of air springs as the elastic medium in production vehicle suspension not only significantly improves riding and handling characteristics, but in addition offers the desirable possibility of selectively varying the road clearance of the sprung mass of the vehicle by varying the amount of air confined in each of the springs.

In the typical air suspension system, the amount of air confined in each spring is automatically regulated by means of a leveling device which normally includes an intake and exhaust valve assembly. These devices are operated by linkage or other mechanical connections, the movements of which are proportional to changes in vertical displacement between the sprung and unsprung mass of the vehicle.

Inasmuch as trim height of the vehicle is originally obtained by adjustment of the mechanical relationship of the leveling valve mechanism with the suspension linkage associated with the spring, it is evident that variation of trim height may be accomplished for example by providing means under the control of the operator for varying the mechanical relationship. In practice, however, an arrangement of this type presents several serious problems. For example, in order to be effective for the purpose intended, adjustment of the linkage for each of the leveling devices must be synchronous. To accomplish this end in practice involves considerable additional motor means or mechanical linkage which is inherently complex and somewhat unreliable.

An object of the present invention is to provide an air suspension system incorporating a leveling device capable of providing two different preselected vehicle trim heights, wherein selective operation of the leveling device is controlled entirely by independent control means mechanically disassociated from the leveling device.

Another object is to provide, in an air suspension system, a leveling valve assembly which is adapted to provide two different vehicle trim heights, the first height obtaining when air flows through the system in one direction and the second height obtaining when the direction of flow is reversed.

A further object is to provide an air suspension system including a pressure and exhaust line communicating through a leveling device with an air spring, wherein valve means are provided for reversing the direction of air flow so that the pressure line becomes the exhaust line and the exhaust line becomes the pressure line, the leveling device being constructed and arranged so as to automatically provide a first vehicle trim height responsive to one position of the control and the second position responsive to the other position of the control.

These and other objects, advantages and features of the invention will become more fully apparent as reference is had to the accompanying specification and drawings wherein:

Fig. 3 is an enlarged fragmentary elevational view looking in the direction of arrows 3—3 of Fig. 1, showing the relation of parts when the spring is in normal trim position;

Fig. 4 is a view similar to Fig. 3, showing the relation of parts when the spring is in the extended trim position;

Fig. 5 is a schematic illustration of an air suspension system including a leveling valve assembly of the type shown in Fig. 1 in association with a manual control valve adapted to reverse the normal direction of air flow through the system; and Fig. 6 is a view similar to the control valve shown in Fig. 5, illustrating its alternate position of operation.

Figure 1:
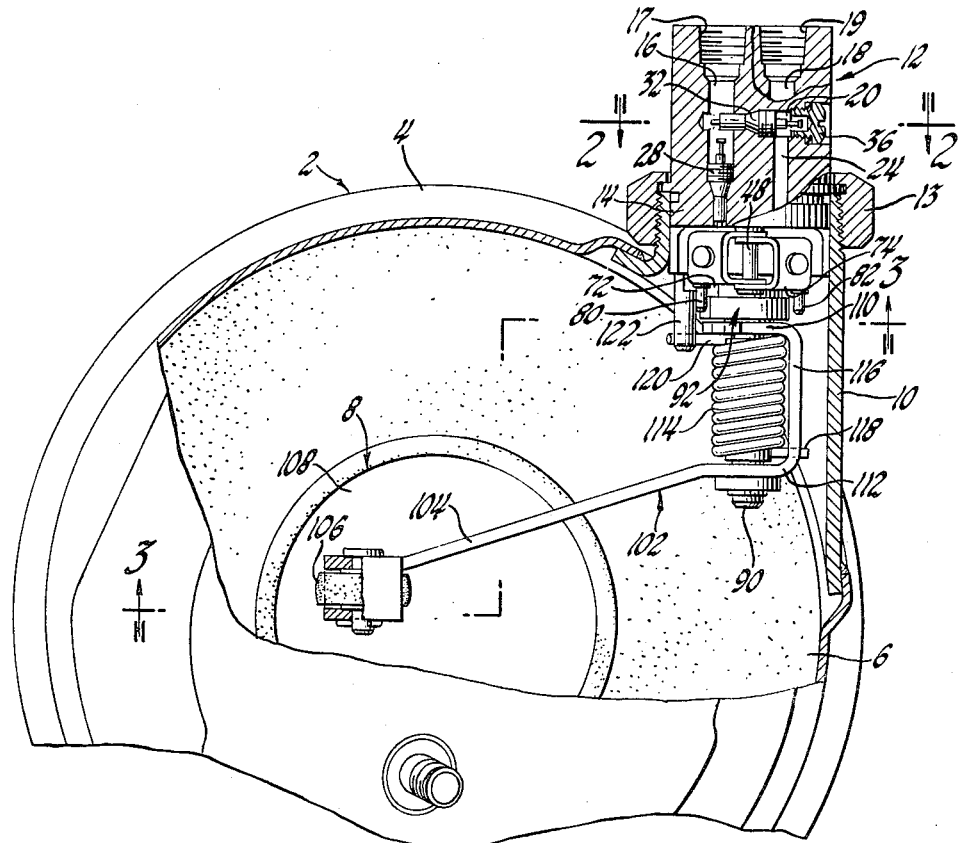
Fig. 1 is a plan view, partly in section and with parts broken away, illustrating an air spring assembly incorporating a dual height leveling valve device in accordance with the present invention.

Referring now particularly to Fig. 1, the reference numeral 2 designates generally an air spring assembly adapted for disposition between the sprung and unsprung mass of a vehicle, not shown. The assembly includes a dome-like member 4, a flexible bellows 6, and a piston member 8. For a complete detailed description of an air spring assembly of the type shown, reference may be had to Serial No. 579,545.

In the illustrated embodiment, the dome 2 is provided with a tangential tubular neck portion 10 which is adapted to receive a cartridge type leveling device 12. Leveling device 12 is positively secured in the neck portion by means of a threaded lock ring 13, which effects an air tight seal between the lip of the neck and the periphery of cartridge 12.

Figure 2:
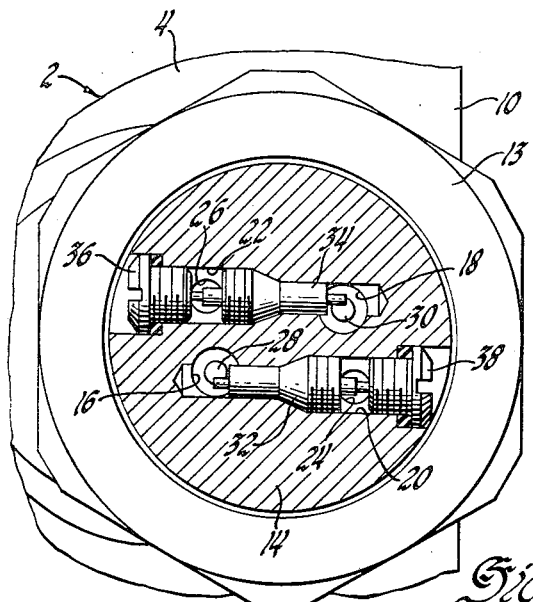
Fig. 2 is a fragmentary elevational view, partly in section, looking in the direction of arrows 2—2 of Fig. 1.

In accordance with the present invention, leveling device 12 includes a valve body 14 having a pair of generally parallel longitudinal passages 16 and 18 which are arranged in vertically spaced relation (Fig. 2). Each passage 16 and 18 extends almost completely through valve body 14 and communicates with the interior of spring assembly 2 in a manner shortly to be described. At their outer ends, passages 16 and 18 are provided with threads 17 and 19 for the purpose of communicating with air inlet and exhaust conduits, not shown. As seen best in Figs. 1 and 2, body 14 is provided with a lateral passage 20 which communicates with passage 16, while a reversely directed lateral passage 22 communicates with passage 18. Passages 20 and 22, in turn, communicate with a second pair of longitudinal passages 24 and 26 which extend inwardly almost completely through body 14, to communicate with the interior of spring assembly 2 in a manner shortly to be described. It will now be seen that passage 24 forms a branch of passage 16 while passage 26 forms a branch of passage 18. Threadably secured at the base of each passage 16 and 18 is a Schrader type valve 28 and 30. Similar Schrader type valves 32 and 34 are threadably secured in lateral passages 20 and 22 in oppositely directed relation. After installation of the latter two valves, the open end of each passage 20 and 22 is capped by a threaded plug 36 and 38.

As seen best in Fig. 5, the inner end of valve body 14 is provided with a first pair of ports 40 and 42 and a second pair of ports 44 and 46 which are formed perpendicular to and communicate with passages 16, 24 and 18, 26, respectively. Ports 40, 42, 44 and 46 open into spring assembly 2 to provide communicating relation between the latter and passages 16, 24 and 18, 26.

Rigidly secured to the forward end of body 14 in vertically spaced relation are a pair of axially directed pins 48 and 50 which are spaced, respectively, laterally midway between ports 40, 42 and 44, 46. Pin 48 has swingably mounted thereon a pair of flap valves 52 and 54, while pin 50 carries a similar pair of flap valves 56 and 58. Each flap valve carries a resilient closure member 60, 62, 64 and 66 which is adapted for abutting engagement with the face of the adjacent port 40, 42, 44 and 46 under the influence of blade spring member 68 connecting valves 52 and 54 and a blade spring member 70 connecting valves 56 and 58.

As seen best in Figs. 1 and 3, each flap valve is provided with inwardly facing vertical wall portions 72, 74, 76 and 78, respectively, on which are secured axially extending pins 80, 82, 84 and 86, respectively.

In order to actuate each flap valve, valve body 14 has rigidly secured thereto a central axially extending pivot shaft 90 on which is rotatably mounted a disc 92. As seen best in Figs. 1 and 3, cam 92 occupies essentially the same vertical plane as pins 80, 82, 84 and 86 and has a contoured periphery formed by a large radius segment 94 and low radius segment 96. The juncture of segments 94 and 96 form shoulders 98 and 100 which are effective upon rotation of cam 92 to impart outward swinging movement to pins 80, 82, 84 and 86, and hence displace the respective closures from their associated ports. Spaced axially inwardly from cam 92 and rotatably supported on shaft 90 is a lever structure 102 having an elongated arm portion 104 extending at right angles to shaft 90 and terminating in a roller assembly 106 adapted for rolling engagement with the top wall 108 of air spring piston 8. Disposed on shaft 90 between the axially spaced inner legs 110 and 112 of lever 102 is a coil spring 114 having one end 118 connected to web 116 of lever 102 and the other end 120 engaging a pin 122 secured to and extending axially inwardly from valve body 14. When arranged in the manner described, spring 114 resiliently biases lever 102 in a counterclockwise direction so that roller 106 is maintained in yielding engagement with piston 8. Therefore, arm 102 is constrained to rotate about the axis of pivot shaft 96 in a predetermined range of angular movement proportional to vertical displacement of piston 8 relative to spring dome 4. In order to effect opening and closing of closures 40, 42 and 44, 46 in a predetermined relationship to vertical displacement of piston 8 and dome 4, cam element 92 is press fitted or otherwise rigidly secured to leg 110 of arm 102 in a predetermined angular relation. As seen best in Fig. 3, this angular relationship causes cam 92 to occupy the angular position shown when the arm 102 is in the corresponding angular position shown, which in illustrated embodiment may be taken as the normal arm position when the spring assembly 2 is inflated for normal vehicle design height. Under these circumstances, it will be evident that clockwise movement of arm 102 will cause shoulder 98 to displace pin 80 while counterclockwise movement will cause shoulder 100 to displace pin 84. On the other hand, when arm 102 assumes an angular position as shown in Fig. 4 (extended height), cam 92 assumes an angular position where clockwise movement thereof displaces pin 86 and counterclockwise movement thereof displaces pin 82. It will now be evident that in order to effect the normal leveling function of assembly 12 for both a normal design height and an extended design height position, valve 52 must function as an intake valve and valve 56 must function as an exhaust valve when arm 102 rises and falls above and below the predetermined normal design height, while valve 58 must function as an intake valve and valve 54 must function as an exhaust valve when arm 102 rises and falls above and below the predetermined extended trim height.

In order to accomplish the foregoing mode of operation in accordance with the invention, the leveling device is placed in communication with an air distribution network by means of the control system illustrated schematically in Fig. 5. As seen in Fig. 5, the system includes an air compressor 124 which supplies air under pressure to a high pressure tank 126 via conduit 128. From tank 126 high pressure air is directed via conduit 130 to a control device 132. Similarly connected to control device 132 is a low pressure or exhaust conduit 134 which returns exhaust air to the inlet side of the compressor. Control device 132 is provided with a central bore 136 in which is disposed a slider valve 138 which is effective in the position shown in Fig. 5 to place high pressure conduit 130 in communication with a conduit 140 and to place exhaust conduit 134 in communication with a conduit 142. Conduit 140 is arranged in common communication with ports 40 and 42 via branch conduits 144 and 146, while conduit 142 is placed in common communication with ports 44 and 46 via branch conduits 148 and 150. Inserted in each branch conduit 144, 146, 148 and 150 is a check valve assembly 152, 154, 156 and 158, respectively. Check valve 152 allows air flow from conduit 140 to port 40, while check valve 154 allows air flow from port 42 to conduit 140. Similarly, check valve 156 permits flow of air from port 44 to conduit 142, while check valve 158 permits flow of air from conduit 142 to port 46. It will thus be evident that with slider valve 138 in the position shown in Fig. 5, flap valve 52 will function responsive to clockwise actuation by cam 92 to permit high pressure air to enter spring 2 via port 40. However, even though port 42 also communicates with conduit 140, no air movement therethrough may take place due to both the disabling action of check valve 154 and the closed position of valve 54. Similarly, exhaust of air may take place only through port 44, since exhaust flow through port 46 is prevented by check valve 158. It will now be seen that even though flap valve 58 is maintained in a continuously open position by cam 92, when arm 102 is in the position shown in Fig. 3, the open condition of port 46 has no effect on the operation of the leveling device. Therefore, as long as slider valve 138 is maintained in the position shown in Fig. 5, valves 52 and 56 function in the conventional manner responsive to angular movement of cam 92 to maintain a predetermined displacement between piston 8 and dome 4 which provides the normal vehicle trim height.

However, upon movement of slider valve 138 to the position shown in Fig. 6, the communicating relationship between conduits 140 and 142 on the one hand and 130 and 134 on the other hand is reversed so that conduit 140 communicates via passage 141 with low pressure conduit 134 and conduit 142 communicates with high pressure conduit 130. It will be evident that as soon as air flow direction in conduits 140 and 142 is reversed, both check valve 152 and flap valve 52 disable port 40, while opening of valve 54 by cam 92 displacing pin 82 permits exhaust of air from the spring through port 42. Similarly, check valve 156 disables port 44, even though valve 56 is open, while opening of valve 58 by cam 92 displacing pin 86 permits introduction of air from conduit 142 into spring 2 through port 46.

Bearing in mind the effect of check valves 152, 154, 156 and 158 under the two different conditions noted resulting from operation of slider valve 138, attention is again directed to Figs. 3 and 4 wherein it will be noted that when cam 92 is in an angular position where alternate angular movement thereof actuates pins 80 and 84, pin 86 is constrained to the open position owing to engagement with the high lobe 94 of the cam. Under these conditions, it will be evident that when arm 102 is operating responsive to variations from the normal trim height of the spring, port 46 will be continuously in an open position. However, as noted previously, even though port 46 would normally allow air to exhaust from the spring into conduit 142 and ultimately to low pressure line 134, check valve 158 prevents such air movement and therefore the open condition of port 46 does not affect the leveling action of valves 52 and 56. However, as soon as slider valve 138 is moved to the position shown in Fig. 6, conduit 142 is converted to a high pressure line and the direction of flow of air operates to unseat check valve 158 allowing high pressure air to enter the spring through port 46 as long as valve 58 is held in open position by the high lobe of cam 92. Naturally, as air enters the spring, the top wall 108 of the piston moves downwardly relative to dome 4 so that arm 102 progressively moves in a counterclockwise direction under the influence of spring 114 until the low side of cam 92 is adjacent pin 86, whereupon flap valve 58 moves to close port 46 and prevent further inflation of the spring.

As seen best in Fig. 4, when the spring assembly is in the extended trim height position, pin 84 engages the high lobe of cam 92 so that valve 56 is maintained in continuous open position. However, even though port 44 places the interior of the spring assembly in open communication with conduit 142, the operation of check valve 156 prevents movement of air from 142 into the spring. When slider valve 138 is returned to the position shown in Fig. 5, conduit 142 is restored to its original function as an exhaust line whereupon air confined in the spring may escape therefrom through port 44. Since the spring pressure is then greater than the pressure in exhaust conduit 142, check valve 156 is unseated and does not prevent movement of air from the spring into conduit 142. As air escapes from the spring, piston 8 progressively moves upwardly to regain its original position with respect to dome 4 (Fig. 3), at which time the high lobe of cam 92 moves past pin 84 permitting the latter to move inwardly and close valve 56 which prevents further exhaust of air.

From the foregoing it will be seen that the operation of the dual trim height leveling device is a completely automatic function effected solely by alternating the direction of flow of air to and from the device. As a result, selection of either of two trim heights is effected instantaneously, without any direct mechanical or electrical connections with the actual leveling device. Furthermore, because the alternate operation of each leveling device does not involve change of initial adjustments, once the initial synchronized relationship of each leveling device is established, there is no possibility of subsequent departure from the synchronized relation.

While but one embodiment of the invention has been shown and described, it will be apparent that other changes and modifications may be made therein. It is, therefore, to be understood that it is not intended to limit the invention to the embodiment shown, but only by the scope of the claims which follow.

What is claimed is:

1. In a motor vehicle, an air suspension system including a pressure line and exhaust line, a dual height leveling valve comprising a body having a first pair of ports and a second pair of ports, a closure for each of said ports, means responsive to change in vehicle trim height for actuating said closures to port opening positions, control means for selectively connecting each pair of ports in communicating relation with either said pressure line or said exhaust line, and means responsive to air flow direction effective to block one port of each of said pairs when said control is in one position and to block the other port of each of said pairs when said control is in another position, whereby the trim height of the vehicle is determined by opening and closing of one of each of said pairs of ports when the control means is in one position and by opening and closing the other of each of said pairs when the control means is in the other position.

2. A dual height leveling device comprising a pair of exhaust ports, a pair of intake ports, a closure for each of said ports, closure operating means effective to alternately actuate the closures for one intake port and one exhaust port responsive to travel through a first range of movement and to alternately actuate the closures for the other intake port and other exhaust port responsive to travel through a second range of movement, and pressure responsive means effective to disable flow through said second mentioned intake and exhaust ports during operation of said first mentioned closures and through said first mentioned intake and exhaust ports during operation of said second mentioned closures.

3. In an air suspended vehicle, a dual height leveling device comprising a pair of exhaust ports, a pair of intake ports, a closure for each of said ports, closure operating means effective to alternately actuate the closures for one intake port and one exhaust port responsive to variation in a normal vehicle trim height and to alternately actuate the closures for the other intake port and other exhaust port responsive to variation in an extended trim height, and pressure responsive means effective to disable flow through said second mentioned intake and exhaust ports during operation of said first mentioned closures and through said first mentioned intake and exhaust ports during operation of said second mentioned closures.

4. In a motor vehicle air suspension system, including a pressure network and an exhaust network, apparatus for selectively effecting automatic leveling of the sprung portion of the vehicle at two different predetermined trim heights, including a leveling device comprising operating means movable through a range of movement having a proportional relation to displacement of the sprung mass of the vehicle relative to the unsprung mass, a first pair of intake and exhaust valves operable responsive to movement of said operating means through one portion of its range of movement, a second pair of intake and exhaust valves operable responsive to movement of said operating means through another portion of its range of movement, and means for connecting said first or second pair of valves selectively with said pressure and exhaust network.

5. In a motor vehicle air suspension system, including a pressure network and an exhaust network, apparatus for selectively effecting automatic leveling of the sprung portion of the vehicle at two different predetermined trim heights, including a leveling device comprising operating means movable through a range of movement having a proportional relation to displacement of the sprung mass of the vehicle relative to the unsprung mass, a first pair of intake and exhaust valves operable responsive to movement of said operating means through one portion of its range of movement, a second pair of intake and exhaust valves operable responsive to movement of said operating means through another portion of its range of movement, and means for connecting said first or second pair of valves selectively with said pressure and exhaust network, said means including check valves arranged to compel unidirectional air flow through each of said valves.

6. In a motor vehicle air suspension system, including a pressure network and an exhaust network, apparatus for selectively effecting automatic leveling of the sprung portion of the vehicle at two different predetermined trim heights, including a leveling device comprising operating means movable through a range of movement having a proportional relation to displacement of the sprung mass of the vehicle relative to the unsprung mass, a first pair of intake and exhaust valves operable responsive to movement of said operating means through one portion of its range of movement, a second pair of intake and exhaust valves operable responsive to movement of said operating means through another portion of its range of movement, and means for connecting said first or second pair of valves selectively with said pressure and exhaust network, said means including check valves arranged to compel unidirectional air flow through each of said valves, the direction of flow with respect to each valve of each of said pairs being opposite.

7. A dual height leveling valve assembly comprising a valve body having a pair of inlet ports and a pair of outlet ports, a movable closure for each of said ports, an operating member engageable with said closures, and means on said operating member adapted to actuate two of said closures upon movement of said member within a first range of movement and to actuate the other two of said closures upon movement of said member within a second range of movement, said means further acting to maintain one of the other two closures in open position during the first range of movement and one of the first mentioned two closures in open position during the second range of movement.

8. A dual height leveling valve assembly comprising a valve body having a pair of diametrically opposed inlet ports and a pair of diametrically opposed outlet ports, a separate movable closure for each of said ports, means biasing each closure into engagement with its associated port, an operating member for said closures angularly movable about an axis equidistant from said ports, and means on said operating member adapted to actuate two of said closures upon movement of said member within a first angular range and to actuate the other two of said closures upon movement of said member within a second angular range.

9. A dual height leveling valve assembly comprising a valve body having a pair of inlet ports and a pair of outlet ports, a separate movable closure for each of said ports, means biasing each closure into engagement with its associated port, an angularly movable operating member for said closures, and a single cam lobe on said operating member formed and arranged with respect to said closures so as to alternately actuate two of said closures upon alternate movement of said member from a first predetermined angular position and to alternately actuate the other two of said closures upon alternate movement of said member from a second predetermined angular position.

10. A dual height leveling valve assembly comprising a valve body having a pair of inlet ports and a pair of outlet ports, a first pair of closures pivotally mounted on said valve body on a common axis and adapted to close one of said inlet ports and one of said outlet ports, a second pair of closure members pivotally mounted on said valve body on a common axis and adapted to close the other inlet port and the other outlet port, an operating lever pivotally mounted on said valve body between said pairs of closures, a cam member associated with said operating lever, said cam member being effective to displace one of each of said pairs of closures upon movement of said lever through a first predetermined angular range and to displace the other of each of said pairs of closures upon angular movement of said lever through a second predetermined range.

11. A dual height leveling valve assembly comprising a valve body having a pair of inlet ports and a pair of outlet ports, a first pair of closures pivotally mounted on said valve body on a first common axis and adapted to close one of said inlet ports and one of said outlet ports, a second pair of closure members pivotally mounted on said valve body on a second common axis and adapted to close the other inlet port and the other outlet port, an operating lever pivotally mounted on said valve body between said first and second common axis, a cam member associated with said operating lever, said cam member being effective to displace one of each of said pairs of closures upon movement of said lever through a first predetermined angular range and to displace the other of each of said pairs of closures upon angular movement of said lever through a second predetermined range.

12. A dual height leveling valve assembly comprising a valve body having a pair of inlet ports and a pair of outlet ports, a first pair of closures pivotally mounted on said valve body on a common axis, spring means urging said closures into engagement with one of said inlet ports and one of said outlet ports, and a second pair of closure members pivotally mounted on said valve body on a common axis spaced from said first mentioned common axis, spring means urging said last mentioned closures into engagement with the other inlet port and the other outlet port, an operating lever pivotally mounted on said valve body between said pairs of closures, a cam member associated with said operating lever, said cam member having shoulder means effective to displace one of each of said pairs of closures upon movement of said lever through a first determined angular range and to displace the other of each of said pairs of closures upon angular movement of said lever through a second predetermined range, and a check valve associated with each of said ports, two of said check valves being arranged to block flow in one direction and the other two being arranged to block flow in the opposite direction.

13. The structure set forth in claim 12 wherein one inlet port and one exhaust port are connected by a branched passage and the other inlet and exhaust port are connected by a branched passage, each branch having disposed therein a check valve, the check valves being disposed in reverse relation.

14. In combination, a valve body, a pair of primary passages formed in said body, a pair of inlet ports, a pair of outlet ports, a pair of branched passages connecting one inlet port and one outlet port with one of said primary passages, a second pair of branched passages connecting the other inlet port and the other outlet port with the other primary passage, a pair of check valves disposed in each pair of branched passages, said valves being arranged so as to block flow from each primary passage to the associated outlet port and from the associated inlet port to said primary passage, a pair of flap valves pivotally connected to said valve body on a common axis, spring means urging said flap valves to positions closing one of said inlet ports and one of said outlet ports, a second pair of flap valves pivotally connected to said valve body on a common axis spaced from said first mentioned common axis, spring means urging said last mentioned flap valves to positions closing the other inlet port and the other outlet port, an operating lever pivotally mounted on said valve body between said pairs of flap valves, a cam member associated with said operating lever, and cam engaging portions on said flap valves, said cam member having circumferentially spaced shoulder means effective to displace one or the other of each of said pairs of flap valves upon alternate angular movement of said lever from a first predetermined angular position and to displace one or the other of each of said pairs of flap valves upon alternate angular movement of said lever from a second predetermined angular position.

15. The combination set forth in claim 14 including a fluid distribution network connected to said primary passages, and means for selectively reversing the direction of fluid flow in said network with respect to said primary passages.

16. The invention set forth in claim 15 wherein said means for selectively reversing fluid flow comprises a two position valve effective in one position to introduce fluid into one primary passage and exhaust fluid from the other, and in the other position to exhaust fluid from the first mentioned passage and introduce fluid into the second mentioned passage.

References Cited in the file of this patent

UNITED STATES PATENTS

| | | |
|---|---|---|
| 1,105,177 | Blum | July 28, 1914 |
| 2,628,637 | Pedrick | Feb. 17, 1953 |
| 2,639,729 | Tulumello | May 26, 1953 |